(12) United States Patent
Van Aert

(10) Patent No.: US 9,677,652 B2
(45) Date of Patent: Jun. 13, 2017

(54) LEDGER MECHANISM FOR ROD MAKING MACHINES

(71) Applicant: International Tobacco Machinery Poland Sp. z o.o., Radom (PL)

(72) Inventor: Jeroen Van Aert, Eindhoven (NL)

(73) Assignee: International Tobacco Machinery Poland SP. Z O.O., Random (PL)

( * ) Notice: Subject to any disclaimer, the term of this patent is extended or adjusted under 35 U.S.C. 154(b) by 68 days.

(21) Appl. No.: 14/899,686

(22) PCT Filed: Jun. 20, 2014

(86) PCT No.: PCT/IB2014/062466
§ 371 (c)(1),
(2) Date: Dec. 18, 2015

(87) PCT Pub. No.: WO2015/001441
PCT Pub. Date: Jan. 8, 2015

(65) Prior Publication Data
US 2016/0146323 A1 May 26, 2016

(30) Foreign Application Priority Data
Jul. 5, 2013 (PL) .......................................... 404572

(51) Int. Cl.
*F16H 1/28* (2006.01)
*F16H 37/12* (2006.01)
(Continued)

(52) U.S. Cl.
CPC ............. *F16H 37/124* (2013.01); *A24C 5/28* (2013.01); *A24D 3/0254* (2013.01)

(58) Field of Classification Search
None
See application file for complete search history.

(56) References Cited

U.S. PATENT DOCUMENTS

RE17,215 E * 2/1929 Dehuff ...................... B01F 7/30
366/288
2,250,584 A * 7/1941 Krueger ................. B23D 51/16
74/52
(Continued)

FOREIGN PATENT DOCUMENTS

DE    2505516 A1    8/1975
FR    2111575 A5    6/1972
(Continued)

OTHER PUBLICATIONS

International Search Report in international application No. PCT/IB2014/062466, mailed on Oct. 23, 2014.
(Continued)

*Primary Examiner* — Dirk Wright
(74) *Attorney, Agent, or Firm* — Oppedahl Patent Law Firm LLC

(57) ABSTRACT

Ledger mechanism for rod making machines of tobacco industry comprising a first stationary ring gear (4), a first orbiting gear (5) staying in mesh with the first stationary ring gear (4), a second movable ring gear (6), a second orbiting gear (7) staying in mesh with the second movable ring gear (6). The ledger mechanism comprises a ledger (11) mechanically connected with the second movable ring gear (6) and the axis of the second orbiting gear (7) is coaxial with the axis of the first orbiting gear (5).

6 Claims, 3 Drawing Sheets

(51) Int. Cl.
*A24C 5/28* (2006.01)
*A24D 3/02* (2006.01)

(56) References Cited

U.S. PATENT DOCUMENTS

| | | | | |
|---|---|---|---|---|
| 2,334,775 | A | * | 11/1943 | Karp ........................ A21C 1/02 184/6.12 |
| 2,688,700 | A | * | 9/1954 | Lewis ...................... H01Q 3/18 343/759 |
| 3,730,034 | A | * | 5/1973 | Preston .................... A24C 5/28 83/310 |
| 3,760,672 | A | * | 9/1973 | Labee ...................... A24C 5/28 131/65 |
| 3,830,126 | A | * | 8/1974 | Ringe ...................... A24C 5/28 83/310 |
| 3,850,065 | A | * | 11/1974 | Labbe ...................... A24C 5/28 83/310 |
| 3,956,955 | A | * | 5/1976 | Marritt ..................... A24C 5/28 83/310 |
| 4,089,228 | A | * | 5/1978 | Obra ....................... F16H 21/365 475/16 |
| 4,398,438 | A | * | 8/1983 | Seragnoli ................. A24C 5/28 131/65 |
| 4,444,210 | A | | 4/1984 | Schumacher |
| 4,534,252 | A | * | 8/1985 | Harrington .............. A24C 5/28 74/27 |
| 4,537,205 | A | * | 8/1985 | Verjux ..................... A24C 5/28 131/280 |
| 4,655,111 | A | * | 4/1987 | Blaker ..................... B26D 1/28 83/356.3 |
| 5,816,261 | A | * | 10/1998 | Dyett ....................... A24C 5/28 131/84.4 |
| 5,992,282 | A | * | 11/1999 | Biondi ..................... A24C 5/28 83/310 |
| 6,478,031 | B1 | * | 11/2002 | Smith ...................... A24C 5/28 131/63 |
| 6,918,328 | B2 | * | 7/2005 | Wohltmann ............. A24C 5/28 131/84.4 |
| 7,992,574 | B2 | * | 8/2011 | Jahnke ..................... A24C 5/28 131/58 |
| 8,662,088 | B2 | | 3/2014 | Owczarek |
| 8,869,969 | B2 | | 10/2014 | Cieslikowski et al. |
| 8,925,708 | B2 | | 1/2015 | Cieslikowski et al. |
| 8,967,370 | B2 | | 3/2015 | Cieslikowski |
| 9,004,261 | B2 | | 4/2015 | Cieslikowski et al. |
| 9,061,835 | B2 | | 6/2015 | Gielniewski |
| 9,161,571 | B2 | | 10/2015 | Sikora |
| 2013/0087056 | A1 | | 4/2013 | Chojnacki |
| 2014/0011652 | A1 | | 1/2014 | Cieslikowski et al. |
| 2014/0097107 | A1 | | 4/2014 | Zagajska |
| 2014/0123826 | A1 | | 5/2014 | Cieslikowski et al. |
| 2014/0158252 | A1 | | 6/2014 | Owczarek |
| 2014/0235416 | A1 | | 8/2014 | Lisowski et al. |
| 2015/0013519 | A1 | | 1/2015 | Cieslikowski et al. |
| 2015/0047137 | A1 | | 2/2015 | Gielniewski |
| 2015/0068376 | A1 | | 3/2015 | Boleslawski |
| 2015/0114543 | A1 | | 4/2015 | Riedel |
| 2015/0114988 | A1 | | 4/2015 | Riedel |
| 2015/0342247 | A1 | | 12/2015 | Ugrewicz |
| 2016/0000142 | A1 | | 1/2016 | Stanikowski et al. |

FOREIGN PATENT DOCUMENTS

| | | |
|---|---|---|
| GB | 1332689 A | 10/1973 |
| GB | 2108820 A | 5/1983 |
| WO | 9804161 A1 | 2/1998 |

OTHER PUBLICATIONS

Written Opinion of the International Searching Authority in international application No. PCT/IB2014/062466, mailed on Oct. 23, 2014.

Polish Search Report in Polish application PL404572, Mar. 6, 2014.

* cited by examiner

LEDGER MECHANISM FOR ROD MAKING MACHINES

The object of the invention is a ledger mechanism for rod making machines in the tobacco industry.

In the tobacco industry rod making machines i.e. cigarette making machines and filter making machines (also combined filter making machines) are used. Continuous tobacco or filter rods are cut into discrete lengths (rods) by a cut-off device. Cutting off is realized by means of a rotary cutting head with knives positioned on its periphery, whereas the axis of rotation of the cutting head is arranged at an angle with relation to a horizontal plane. Inclining the cutting head provides a horizontal speed component of the knife parallel to the rod movement, the horizontal speed component of the knife should be equal to the speed of the rod being cut while cutting in order to enable proper cutting a continuous moving rod. Cutting a continuous rod requires that such a rod is supported whilst cutting which is usually realized by means of a ledger which has a round hole or holes to guide the rod and a slot through which knives of a cutting head move repeatedly. Typically the ledger is designed as a set of cutting tubes with a certain distance between them. In the art there are several mechanisms involving rotary motion for driving a ledger whereas the ledger itself makes linear reciprocating movement. British patent GB2108820 presents a ledger driven by a ledger mechanism comprising two gear arrangements consisting of an internal gear within which orbits an external gear which is half the diameter of the internal gear. The ledger is positioned on a connecting member the ends of which are pivotally joined with the external gears at points on the pitch diameter of the gears, due to which the ledger makes linear horizontal reciprocating movement.

American U.S. Pat. No. 6,478,031 presents a similar mechanism where a connecting member being a rod-supporting part between drive gears is made of two members connected to one another with a pivot pin. The two members are connected by an anti-backlash spring. Another American U.S. Pat. No. 4,444,210 presents a ledger mechanism in which there is used an elastic cushioning insert to manage with tensions in the connecting member.

All the above mentioned documents disclose mechanisms having two gear arrangements with a ledger situated on connecting members between the gear arrangements. Very important issue of the above mentioned inventions is the distance between the centre of the mass of the ledger and the line of movement of the pivotal joints of the gear arrangements. Due to this distance inertia forces are produced which cannot be balanced easily, the bigger the distance is the bigger inertia forces and vibrations are produced. The result is very noisy operation of the mechanisms.

The purpose of the present invention is developing a ledger mechanism having one gear arrangement which can be used at very high speed of a continuous rod up to about 600 m/min with improved realization of horizontal movement where a ledger is mounted on a non-rotary element of the gear arrangement.

The object of the invention is a ledger mechanism for rod making machines of tobacco industry comprising a first stationary ring gear, a first orbiting gear staying in mesh with the first stationary ring gear, a second movable ring gear, a second orbiting gear staying in mesh with the second movable ring gear, and a ledger mechanically connected with the second movable ring gear. The ledger is characterized in that the axis of the second orbiting gear is coaxial with the axis of the first orbiting gear.

Ledger mechanism is characterized in that the transmission ratio of the first stationary ring gear and the first orbiting gear is k=2.

Ledger mechanism is characterized in that the transmission ratio of the second movable ring gear 6 and the second orbiting gear 7 is k=2.

Ledger mechanism is characterized in that the pitch diameter of the first orbiting gear and the pitch diameter of the second orbiting gear are equal.

The advantage of applying the ledger mechanism according to the invention is achieving very low level of noise. Moreover the whole unit can be easily exchanged in case a new length of rods is needed in production. The ledger mechanism according to the invention comprises less parts than other known ledger mechanisms.

The object of the invention will be described in details in an embodiment with reference to the drawing. In the drawing.

Figure 1:
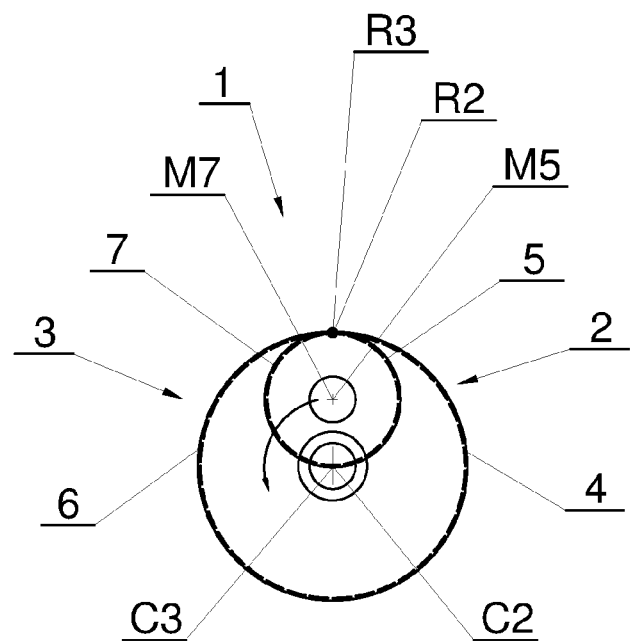
FIG. 1 shows schematically a kinematics diagram of a gear arrangement of a ledger mechanism according to the invention in one position.
Figure 2:
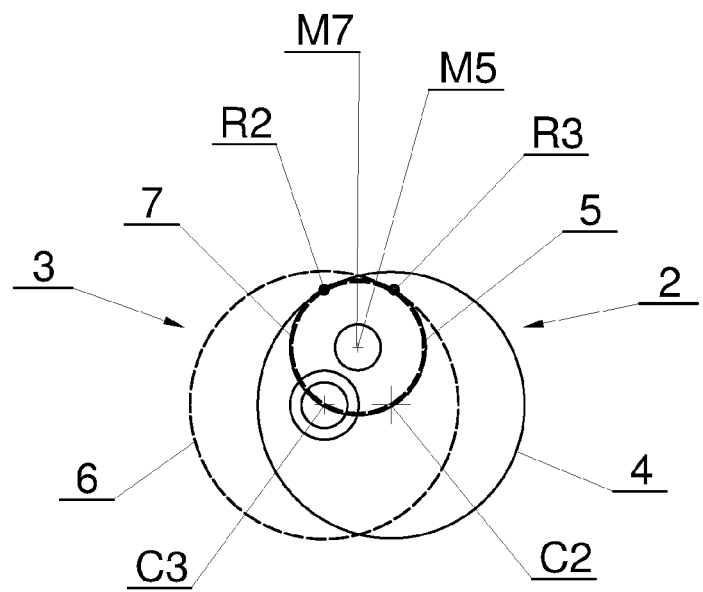
FIG. 2 shows a kinematics diagram of a gear arrangement of FIG. 1 in another position.

FIG. 1 presents schematically a kinematics diagram of a gear arrangement 1 applied in the mechanism according to the invention. In the presented gear arrangement 1 there are two sets 2 and 3 of gears. The first set 2 of gears comprises a first stationary ring gear 4 and a first orbiting gear 5. The first stationary ring gear 4 has internal teeth, the teeth of the first orbiting gear 5 are in mesh at point R2 with the teeth of the first stationary ring gear 4, whereas the transmission ratio k of the first stationary ring gear 4 and the orbiting gear 5 is 2:1 i.e. k=2. The first orbiting gear 5 orbits around the center C2 of the stationary ring gear 4 and while orbiting the orbiting gear 5 rotates around its center M5. The second set 3 of gears (shown with dashed lines) comprises a second movable ring gear 6 and a second orbiting gear 7. The second movable ring gear 6 has internal teeth, the teeth of the second orbiting gear 7 are in mesh at point R3 with the teeth of the second movable ring gear 6, whereas the transmission ratio k of the second movable ring gear and the second orbiting gear is 2:1 i.e. k=2. The second orbiting gear 7 orbits around the center C3 of the second movable ring gear 6 and its centre M7 overlaps the center M5 of the first orbiting gear 5. In the diagram shown in FIG. 1 centers C2 and C3 coincide, also points R2 and R3 coincide. FIG. 2 presents elements of the mechanism 1 according to the invention after the orbiting gears 5 and 7 have made some angular movement around the center C2 due to the forced movement of the first orbiting gear 5. The point R2 of meshing has moved to the left and the point R3 of meshing has moved to the right in the plane of the drawing. The center C3 of the second movable ring gear 6 has moved to the left in the plane of the drawing. According to the invention a ledger is attached to the second movable ring gear 6 and makes reciprocal movement along a horizontal line, the stroke of the reciprocal movement is equal to the pitch diameter of the ring gear 4. Thus the rotary movement of the orbiting gears 5 and 7 is transformed into reciprocal linear movement of the point C3.

Figure 3:
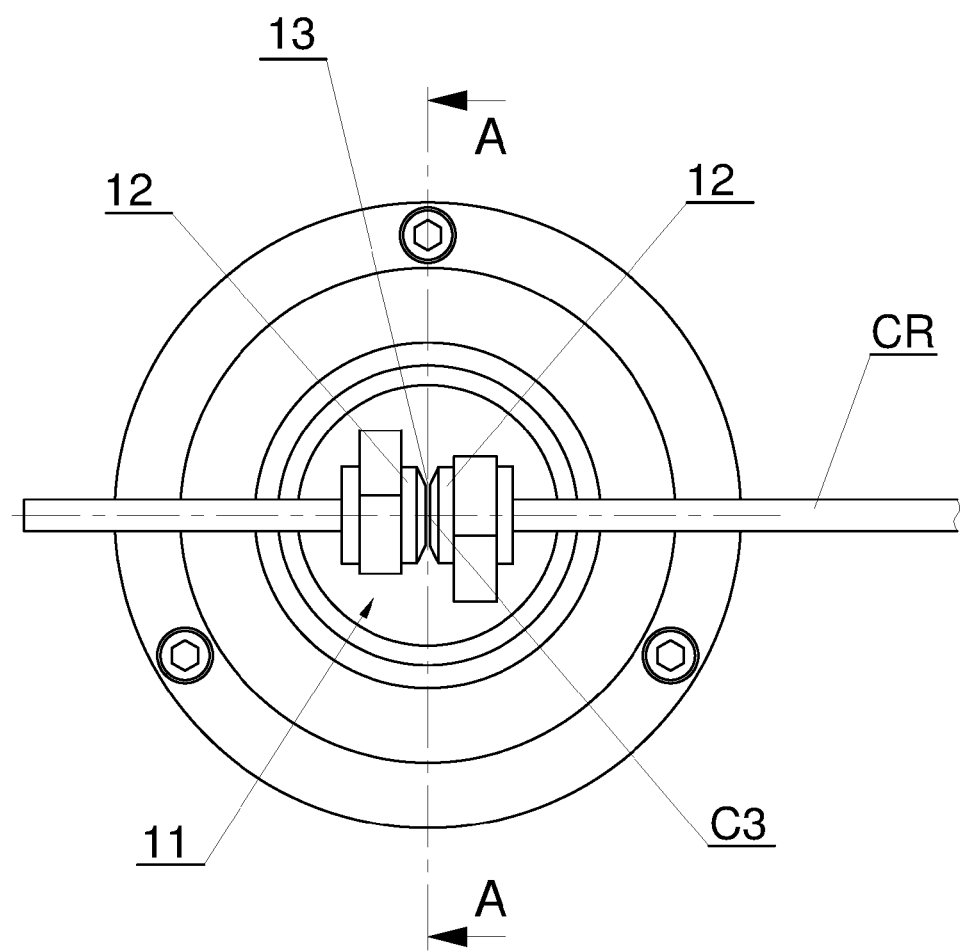
FIG. 3 shows a ledger mechanism in front view.

FIG. 3 presents a ledger mechanism according to the invention in a front view. The ledger 11 comprises two tubes 12 through which travels a continuous filter or tobacco rod CR. Knives of a cutting head (not shown) pass through a slot 13 between the tubes 12 and cut the rod CR into discrete lengths. The ledger 11 follows the movement of the center C3 i.e. makes reciprocal movement to the left and right in the plane of the drawing.

Figure 4:
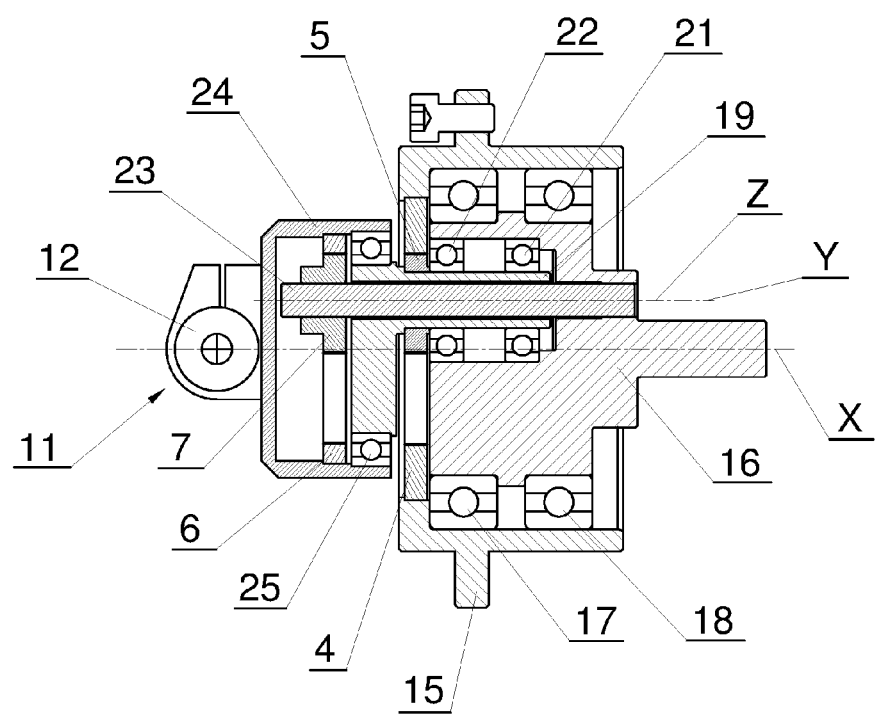
FIG. 4 shows a cross-section of a ledger mechanism of FIG. 3.

FIG. 4 shows a cross-section A-A through the ledger mechanism of FIG. 3. The mechanism has a housing 15 in which there is a main shaft 16 having an axis X rotary assembled by means of bearings 17 and 18. The axis X relates to the center C2 in FIGS. 1 and 2. The main shaft 16 is driven by a known geared motor which is not shown in the drawing. In the main shaft there is a hollow shaft 19 rotary assembled by means of bearings 21 and 22, on the shaft 19 there is fixed a first orbiting gear 5 which stays in mesh with a first stationary ring gear 4. The axis Y of the first orbiting gear 5 relates to the center M5 in FIGS. 1 and 2. On the shaft 23 mounted in the shaft 16 there is fixed a second orbiting gear 7 which stays in mesh with a movable ring gear 6 fixed in a gear mounting 24 rotary mounted on the hollow shaft 19 by means of a bearing 25. The axis Z of the gear 7 relates to the center M7 in FIGS. 1 and 2. The second movable ring gear 6 makes reciprocal movement in the direction perpendicular to the plane of the drawing with the gear mounting 24 on which is fixed a ledger 11. A continuous tobacco or filter rod travels through the tubes 12 of the ledger 11. In the presented embodiment the orbiting gears 5 and 7 have the same diameter.

Typical aspects of balancing the mechanism commonly known to specialists in mechanics are omitted in the description.

The advantage of the ledger mechanism according to the invention is a combination of small dimensions of the mechanism and low level of noise. The ledger mechanism is easily exchangeable so the time needed for setting a new length of cutting is very short. It can be realized by unscrewing the housing with a mechanism and replacing it with a housing comprising a mechanism for a new length of cutting.

The invention claimed is:

1. A ledger mechanism for rod making machines of tobacco industry comprising
   a first stationary ring gear (4),
   a first orbiting gear (5) staying in mesh with the first stationary ring gear (4),
   a second movable ring gear (6), and
   a second orbiting gear (7) staying in mesh with the second movable ring gear (6),
   characterized in that
   it comprises a ledger (11) mechanically connected with the second movable ring gear (6), and
   the axis of the second orbiting gear (7) is coaxial with the axis of the first orbiting gear (5).

2. The ledger mechanism according to claim 1, wherein the transmission ratio of the first stationary ring gear (4) and the first orbiting gear (5) is k=2.

3. The ledger mechanism according to claim 1, wherein the transmission ratio of the second movable ring gear (6) and the second orbiting gear (7) is k=2.

4. The ledger mechanism according to claim 1, wherein the pitch diameter of the first orbiting gear (5) and the pitch diameter of the second orbiting gear (7) are equal.

5. The ledger mechanism according to claim 2, wherein the pitch diameter of the first orbiting gear (5) and the pitch diameter of the second orbiting gear (7) are equal.

6. The ledger mechanism according to claim 3, wherein the pitch diameter of the first orbiting gear (5) and the pitch diameter of the second orbiting gear (7) are equal.

* * * * *

UNITED STATES PATENT AND TRADEMARK OFFICE
CERTIFICATE OF CORRECTION

| | |
|---|---|
| PATENT NO. | : 9,677,652 B2 |
| APPLICATION NO. | : 14/899686 |
| DATED | : June 13, 2017 |
| INVENTOR(S) | : Jeroen Van Aert |

Page 1 of 1

It is certified that error appears in the above-identified patent and that said Letters Patent is hereby corrected as shown below:

On the Title Page

(73) Assignee should read: International Tobacco Machinery Poland SP. Z O.O., Radom (PL)

Signed and Sealed this
Eighth Day of August, 2017

Joseph Matal
*Performing the Functions and Duties of the*
*Under Secretary of Commerce for Intellectual Property and*
*Director of the United States Patent and Trademark Office*